United States Patent
Chen

(10) Patent No.: US 6,810,764 B2
(45) Date of Patent: Nov. 2, 2004

(54) BICYCLE SPEED CHANGE CONTROL DEVICE

(76) Inventor: Chieh-Yuan Chen, No. 2, Alley 2, Lane 847, Chung San Road, Shen Kang Hsian, Taichung Hsien (TW), 429

( * ) Notice: Subject to any disclaimer, the term of this patent is extended or adjusted under 35 U.S.C. 154(b) by 113 days.

(21) Appl. No.: 10/348,947

(22) Filed: Jan. 23, 2003

(65) Prior Publication Data

US 2004/0025621 A1 Feb. 12, 2004

(30) Foreign Application Priority Data

Aug. 8, 2002 (TW) ........................................ 91212262 U

(51) Int. Cl.[7] .............................................. F16C 1/12
(52) U.S. Cl. ........................................ 74/502.2; 74/489
(58) Field of Search ........................ 74/473.15, 473.3, 74/489, 501.6, 502.2, 527, 575

(56) References Cited

U.S. PATENT DOCUMENTS 5,682,794 A * 11/1997 Shibata ........................ 74/489
6,497,163 B2 * 12/2002 Liu et al. ..................... 74/502.2
6,502,477 B1 * 1/2003 Assel .......................... 74/502.2
6,553,860 B2 * 4/2003 Blaschke .................... 74/501.6
2002/0124678 A1 * 9/2002 Chen .......................... 74/502.2

* cited by examiner

Primary Examiner—Chong H. Kim
(74) Attorney, Agent, or Firm—Bacon & Thomas PLLC

(57) ABSTRACT

A bicycle speed change control device comprises a housing; a cable control set fastened pivotally with the housing and reversibly supported, the cable control set comprising a first toothed engagement portion, a second toothed engagement portion, and a third toothed engagement portion; a first lever fastened pivotally with the housing and reversibly supported, the first lever having a push member being forced into engagement with the third toothed engagement portion of the cable control set and to further turn the cable control set when the first lever is turned in one direction, the push member being disengaged from the third toothed engagement portion of the cable control set when the first lever reversed; and a second lever fastened pivotally with the housing and reversibly supported, the second lever having a tooth adapted to engage the first toothed engagement portion and second toothed engagement portion of the cable control set selectively.

10 Claims, 6 Drawing Sheets

BICYCLE SPEED CHANGE CONTROL DEVICE

BACKGROUND OF THE INVENTION

1. Field of the Invention

The present invention relates generally to bicycles and, more specifically, to a bicycle speed change control device for controlling the gear shifting position of a derailleur of the bicycle.

2. Description of the Related Art

U.S. Pat. No. 5,094,120 disclosed a bicycle speed change control device entitled "Bicycle Speed Change Lever Assembly", which comprises a first lever pivotally pressed to wind up a control cable against a tension applied thereto, a second lever pivotally pressed to pivotally return the first lever for paying out the control cable, and an indexing mechanism provided between the first and second levers for holding the first lever at a selected one of stepwise pivotal positions against the cable tension. The indexing mechanism is made to have a skip preventing function for ensuring that the first lever is pivotally returned stepwise.

This design of bicycle speed change lever assembly is still not satisfactory in function. Because the freewheel gear cluster of an advanced bicycle is comprised a big number of gears, it requires a big angular momentum, resulting in inconvenience of approach of fingers to the two distal ends of the operating range.

Further, because the engagement structure between the second lever and the indexing mechanism is not highly precisely matched, the first lever may be pivotally returned in a rush from the last gear shift position to the first gear shift position, resulting in an improper speed change.

SUMMARY OF THE INVENTION

The present invention has been accomplished to provide a bicycle speed change control device, which eliminates the aforesaid drawbacks.

It is therefore the main object of the present invention to provide a bicycle speed change control device, which can be turned forwards through an angle to change the gearshift position, and then returned without changing the gearshift position for a next forward gearshift position control operation.

It is another object of the present invention to provide a bicycle speed change control device, which positively secures the cable control set in position, preventing an engagement skit accidentally.

It is still another object of the present invention to provide a bicycle speed change control device, which drives the cable control set to rotate positively during forward gearshift position control, and enables the cable control set to be smoothly returned upon operation of the second lever to reverse the gearshift position.

To achieve these and other objects of the present invention, the bicycle speed change control device comprises a housing connectable to one handlebar of a bicycle, the housing comprising a first coupling portion and a second coupling portion; a cable control set fastened pivotally with the first coupling portion of the housing and reversibly supported on the first coupling portion of the housing by a torsion spring and adapted to drive the cable to control the gearshift position of a derailleur of the bicycle, the cable control set comprising a first toothed engagement portion, a second toothed engagement portion, and a third toothed engagement portion; a first lever, the first lever comprising a lever body fastened pivotally with the first coupling portion of the housing and reversibly supported on the first coupling portion of the housing by a torsion spring, the lever body of the first lever having a free end terminating in a finger press portion, and a push member provided at one end of the lever body of the first lever remove from the finger press portion of the lever body of the first lever, the push member being forced into engagement with the third toothed engagement portion of the cable control set and to further turn the cable control set when the first lever is turned in one direction, the push member being disengaged from the third toothed engagement portion of the cable control set when the first lever reversed to a predetermined position; and a second lever, the second levers comprising a lever body fastened pivotally with the second coupling portion of the housing and reversibly supported on the second coupling portion of the housing by a torsion spring, the lever body of the second lever having a fixed end pivoted to the second coupling portion of the housing, a free end terminating in a finger press portion, and a tooth disposed adjacent to the fixed end and adapted to engage the first toothed engagement portion and second toothed engagement portion of the cable control set selectively, the tooth of the second lever being moved with the second lever over teeth of the first toothed engagement portion stepwise when the first lever turned to rotate the cable control set forwards, the tooth of the second lever being moved with the second lever into engagement with the first toothed engagement portion and the second toothed engagement portion of the cable control set alternatively for enabling the cable control set to be returned when the second lever alternatively pressed and released.

DETAILED DESCRIPTION OF THE PREFERRED EMBODIMENT

Figure 1:
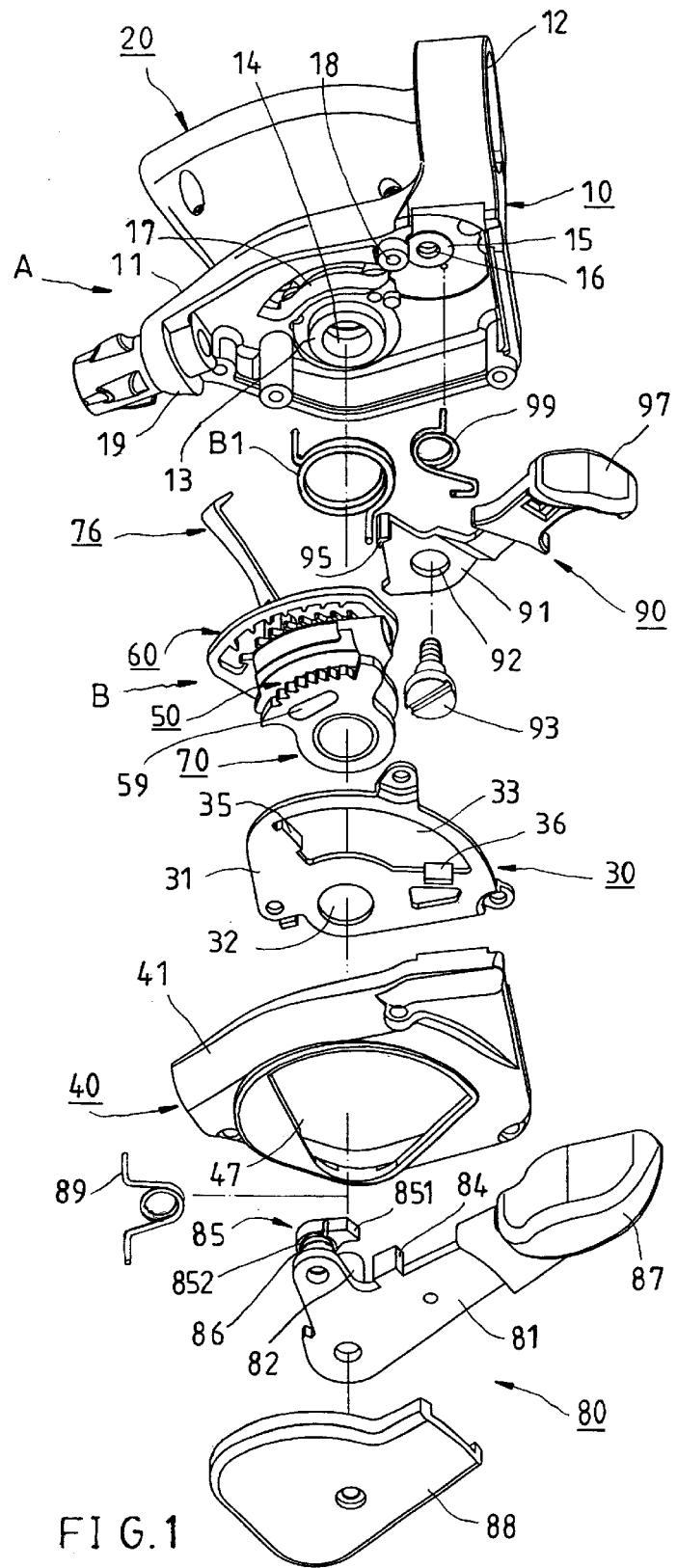
FIG. 1 is an exploded view of a bicycle speed change control device according to the present invention.
Figure 2:
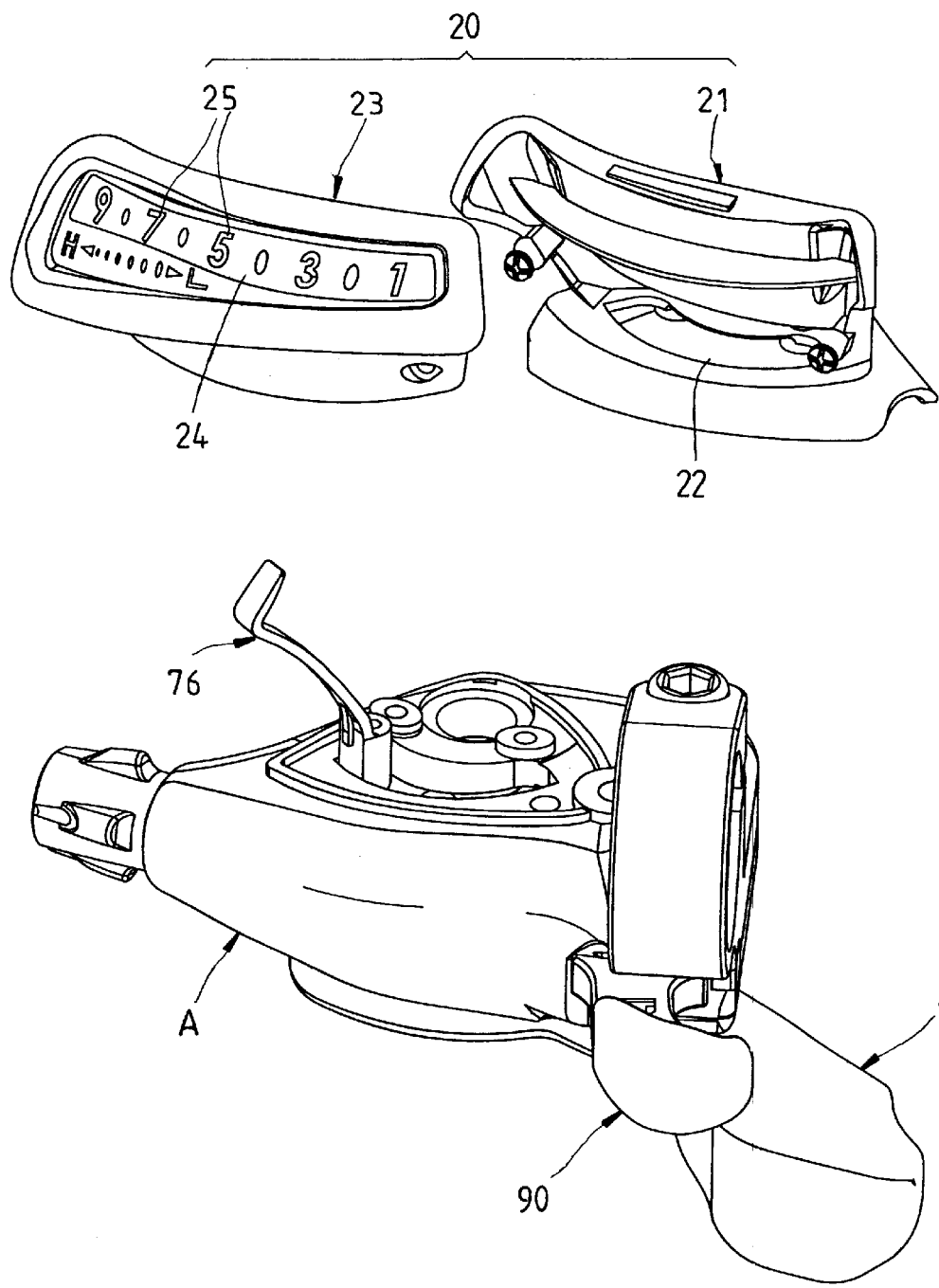
FIG. 2 is an elevational view of the bicycle speed change control device after disconnection of the indicator unit from the casing of the housing.
Figure 3:
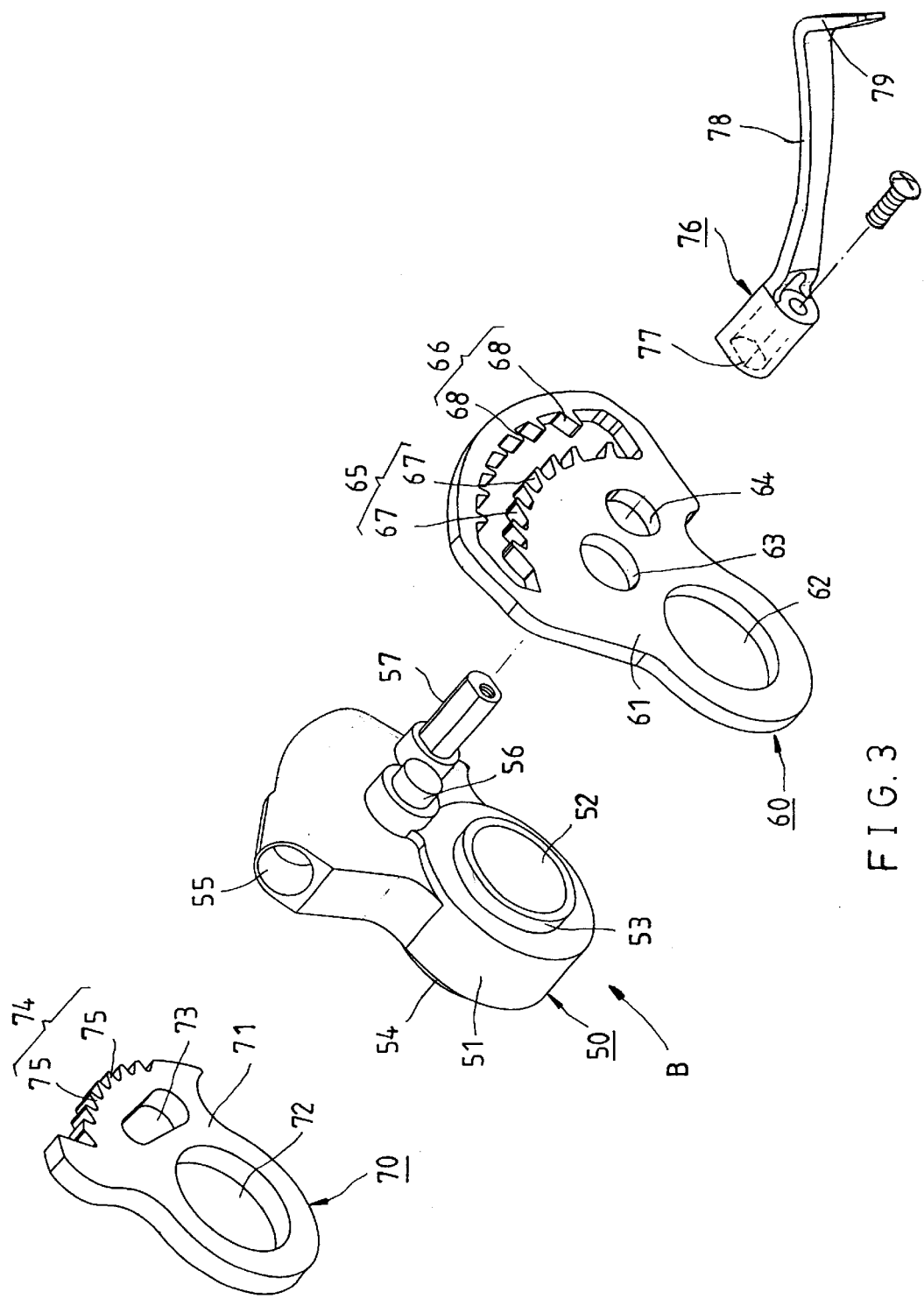
FIG. 3 is an exploded view of the cable control set for the bicycle speed change control device according to the present invention.

Referring to Figures from 1 through 8, a bicycle speed change control device in accordance with the present invention is shown comprised of a housing A, a cable control set B, a first lever 80, and a second lever 90.

The housing A is comprised of a casing 10, an indicator unit 20, a limiter 30, and a cover 40.

The casing 10 comprises a bottom shell 11, a mounting portion 12 connectable to a bicycle handlebar (not shown), a first coupling portion 13 defining a pivot hole 14, a second coupling portion 15 defining a screw hole 16, a sliding slot 17, a plurality of threaded mounting holes 18, and a cable holder portion 19 near one end.

The indicator unit 20 is mounted on the top side of the casing 10, comprising a shell 21 defining a space 22, a face panel 23, a transparent display window 24, and gearshift position marks 25 marked on the show window 24.

The limiter 30 is formed of a flat plate member 31 fixedly fastened to the threaded mounting holes 18 of the casing 10 by screws, having a through hole 32, an opening 33, a first stop lug 35 at one end of the opening 33, and a second stop lug 36 at the other end of the opening 33.

The cover 40 comprises a cover shell 41 fastened to the threaded mounting holes 18 of the casing 10 by screws, and an opening 47 through the cover shell 41 for the passing of the first lever 80.

The cable control set B is comprised of a cable wheel 50, a first engagement member 60, a second engagement member 70, a pointer 76, and a return spring B1 hooked in the housing A for automatically returning the cable control set B.

The cable wheel 50 is fastened pivotally with the first coupling portion 13 of the housing A, comprising a wheel body 51, a pivot hole 52, a first coupling portion 53, a second coupling portion 54, a cable hole 55, a first positioning portion 56, a second positioning portion 57, and a third positioning portion 59.

The first engagement member 60 is formed of a flat plate member 61 having a through hole 61, a first coupling hole 63, a second coupling hole 64, a first engagement portion 65 formed of a series of teeth 67, and a second engagement segment 66 formed of a series of teeth 68.

The second engagement member 70 is formed of a flat plate member 71 having a through hole 72, a positioning hole 73, and an engagement portion 74 formed of a series of teeth 75. The indicator 76 is an elongated member having a mounting portion 77 connectable to the cable wheel 50, an elongated extension portion 78 extended from the mounting portion 77, and an indicator tip 79 extended from one end of the extension portion 78 remote from the mounting portion 77 and approached to the display window 24 to indicate one gearshift position.

The first lever 80 is comprised of a lever body 81 has a pivot rod 82 disposed near its one end and fastened pivotally with the first coupling portion 13 of the casing 10, a stop rod 84 adapted to limit forward stroke of the first lever 80, a push member 85 is fastened pivotally with one end of the lever body 81 adjacent to the pivot rod 82 and supported in position by a torsion spring 86, the push member 85 having an engagement end 851 and a push end 852, a finger press portion 87 disposed at its other end remote from the pivot rod 82 for pressing with the thumb to turn the first lever 80, a torsion spring 89 is mounted on the pivot rod 82 of the lever body 81 and connected between the lever body 81 and the casing 10 for automatically returning the lever body 81 when the lever body 81 released after each operation.

The second lever 90 is comprised of a lever body 91, and a torsion spring 99. The lever body 91 has a pivot hole 92 disposed at its one end and pivotally connected to the screw hole 16 of the second coupling portion 15 of the casing 10 by a screw 93, a tooth 95 disposed adjacent to the pivot hole 92 for engaging the first engagement portion 65 or second engagement portion 66 of the first engagement member 60 of the cable control set B, and a finger press portion 97 disposed at its other end remote from the pivot hole 92. The torsion spring 99 is mounted on the screw 93 and connected between the finger press portion 97 and the casing 10.

Figure 4:
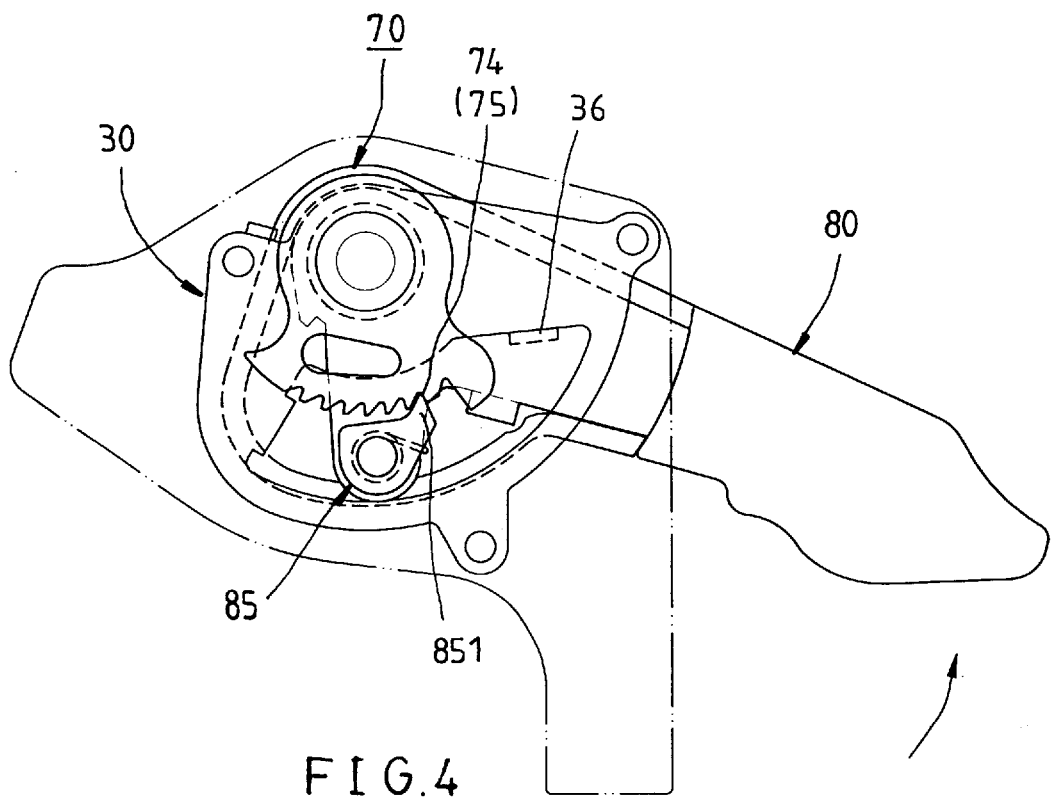
FIG. 4 is a plain assembly view of the first lever and the cable control set, showing a forward gearshift control action of the first lever according to the present invention.
Figure 5:
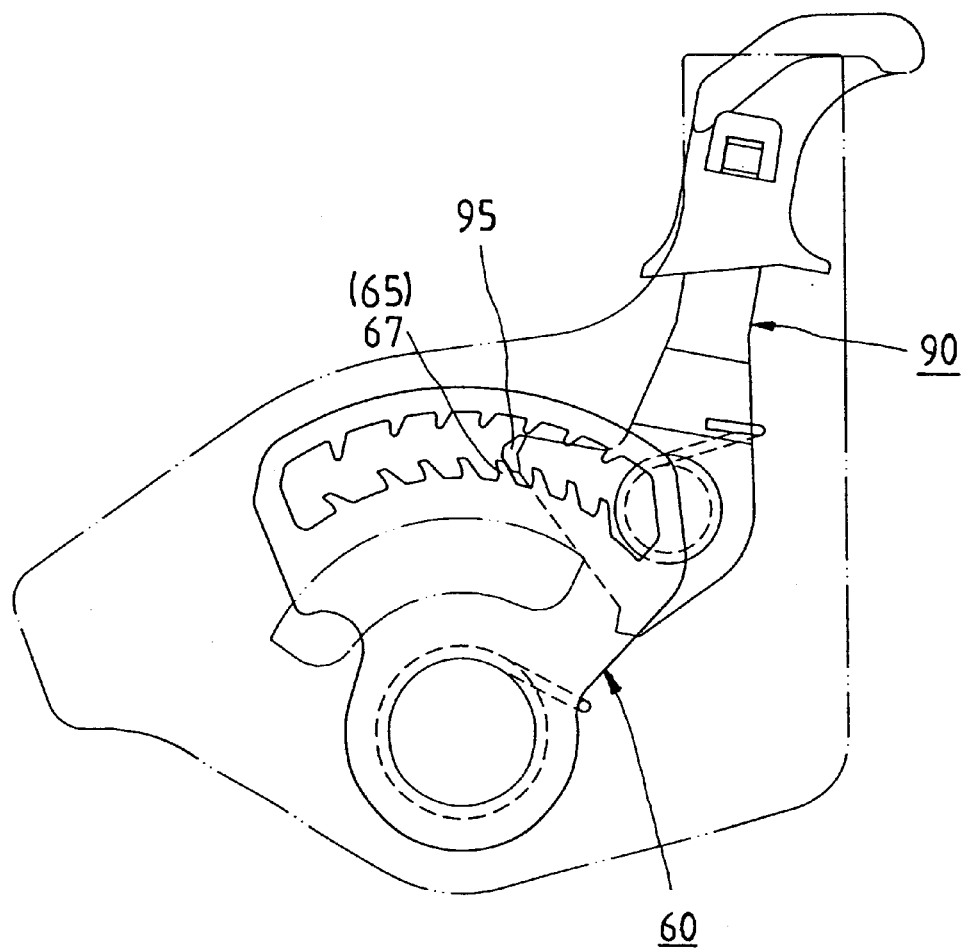
FIG. 5 is a plain assembly view of the second lever and the cable control set, showing a turning status of the cable control set according to the present invention.
Figure 7:
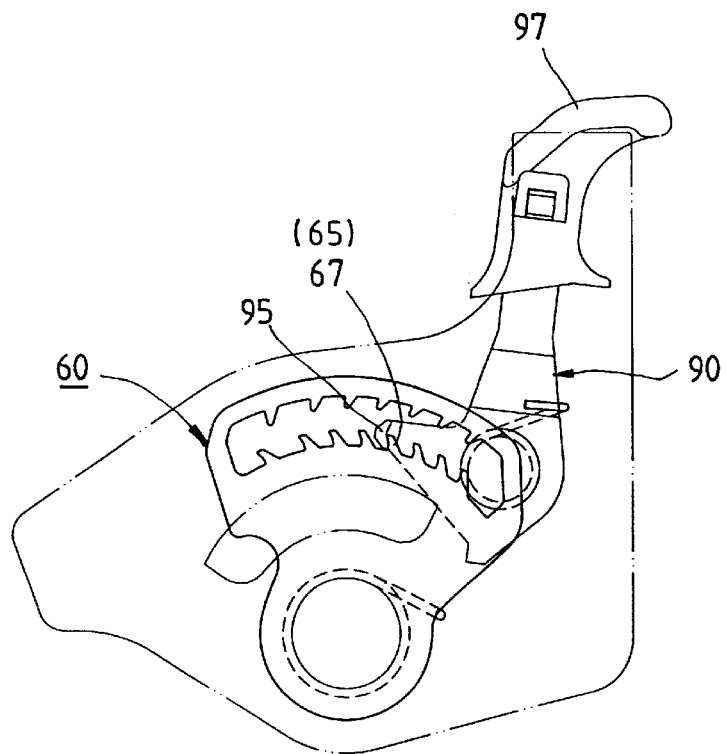
FIG. 7 is another plain assembly view of the second lever and the cable control set, showing the tooth of the second lever engaged with the first engagement portion of the first engagement member.
Figure 8:
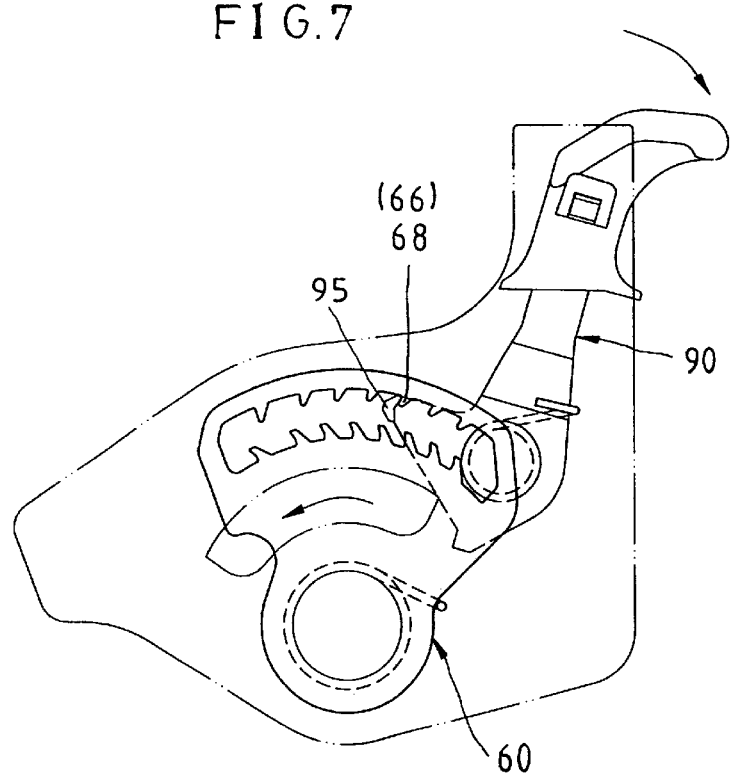
FIG. 8 is still another plain assembly view of the second lever and the cable control set, showing the tooth of the second lever engaged with the second engagement portion of the first engagement member.

The operation of the present invention is outlined hereinafter:

When shifting the gearshift position forwards, turn the first lever 80 with the thumb, as shown in FIG. 4, to force the engagement end 851 of the push member 85 into engagement with the teeth 75 of the engagement portion 74 of the second engagement member 70, and to further turn the cable control set B. At this time, as shown in FIG. 5, the tooth 95 of the second lever 90 is moved over the teeth of the first engagement member 60 step wise, achieving the desired speed change control. By means of the indicator unit 20, the bicycle rider knows the controlled gearshift position.

The first lever 80 is prohibited from forward movement when the stop rod 84 stopped at the second stop lug 36 of the limiter 30.

Figure 6:
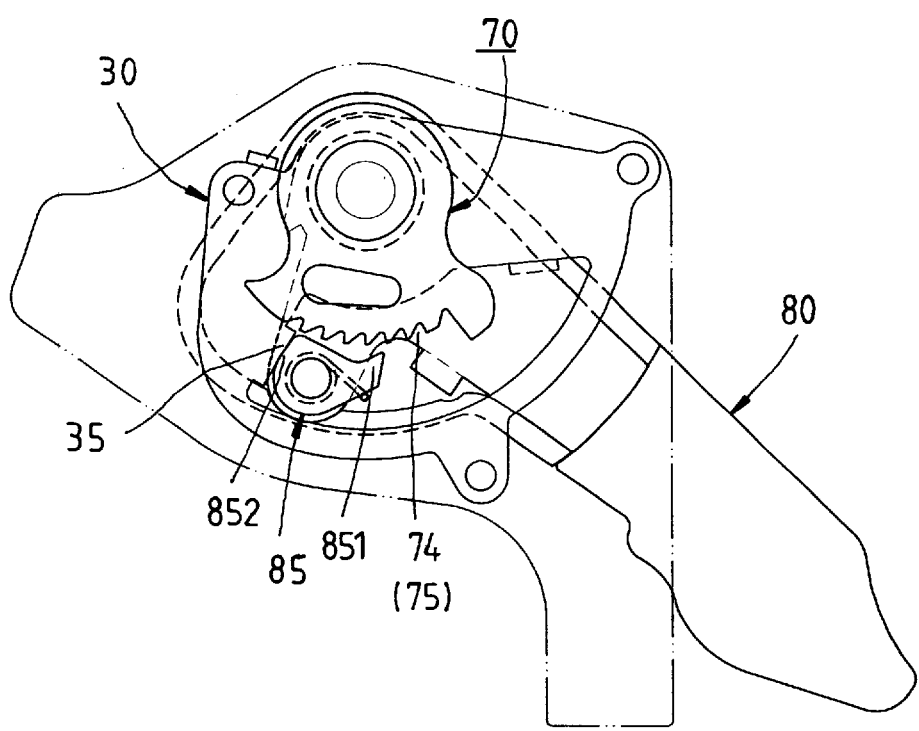
FIG. 6 is another plain assembly view of the first lever and the cable control set, showing the first lever returned according to the present invention.

When released the first lever 80, as shown in FIG. 6, the first lever 80 is turned reversely by the spring force of the torsion spring 89 to force the push end 852 against the first stop lug 35 of the limiter 30 of the housing A, thereby causing the push member 85 to be biased to disengage the engagement end 851 from the teeth 75 of the engagement portion 74 of the second engagement member 70 of the cable control set B. At this the bicycle rider can then press the first lever 80 to shift the gearshift position further. By means of repeating the aforesaid procedure, the bicycle rider can conveniently control the derailleur of the bicycle with the thumb from the first gearshift position to the last gearshift position.

When reversing the derailleur from the last gearshift position to the first gearshift position, repeatedly press and release the second lever 90, for enabling the tooth 95 of the second lever 90 to move over the teeth 67 and 68 of the first and second engagement portions 65 and 66 stepwise in the reversed direction.

According to the present invention, the diameters of the first coupling hole 63 and second coupling hole 64 of the first engagement member 60 are respectively greater than the outer diameters of the first positioning portion 56 and second positioning portion 57 of the cable wheel 50, such that the cable wheel 50 moves the first engagement 60 only when turned through an angle.

Further, the tooth 95 of the second lever 90 has a <-shaped profile for positive engagement with the teeth 67 and 68 of the first and second engagement portions 65 and 66 of the first engagement member 60, preventing an engagement skip.

A protocol of bicycle speed change control device has been constructed with the features of FIGS. 1~8. The bicycle speed change control device functions smoothly to provide all of the features discussed earlier.

Although a particular embodiment of the invention has been described in detail for purposes of illustration, various modifications and enhancements may be made without departing from the spirit and scope of the invention.

Accordingly, the invention is not to be limited except as by the appended claims. For example, the housing A can be made having the limiter 30 formed integral with the casing 10 without the cover 40, or having the limiter 30 formed integral with the cover 40.

The cable control set B can be made without the pointer 76, or having the cable wheel 50 formed integral with second engagement member 70, or having the cable wheel 50 formed integral with the first engagement member 60 and the second engagement member 70.

As indicated above, the bicycle speed change control device has the following advantages:

1. The first lever can be pressed through a predetermined angle to shift the derailleur to one intermediate gearshift position between the first and last gearshift positions, and then automatically returned to its former position, and then pressed again to shift the derailleur forwards from the firstly set intermediate gearshift position toward the last gearshift position. Therefore, the bicycle rider can easily and conveniently control the desired speed change with the thumb.

2. The second lever can positively be maintained in engagement with the teeth of the first and second engagement portions of the first engagement member, preventing reversing of the first lever accidentally.

3. The push member of the first lever effectively drives the cable control set during forward gearshift operation, and enables the cable control set to be reversed when changing the gearshift position in the reversed direction.

What the invention claimed is:

1. A bicycle speed change control device installed in a bicycle and adapted to drive a cable to further control the gearshift position of a derailleur of the bicycle, the bicycle speed change control device comprising:

a housing connectable to a handlebar of the bicycle said housing comprising a first coupling portion and a second coupling portion;

a cable control set fastened pivotally with the first coupling portion of said housing and reversibly supported on the first coupling portion of said housing by spring means thereof and adapted to drive the cable to control the gearshift position of the derailleur of the bicycle, said cable control set comprising a first toothed engagement portion, a second toothed engagement portion, and a third toothed engagement portion;

a first lever, said first lever comprising a lever body fastened pivotally with the first coupling portion of said housing and reversibly supported on the first coupling portion of said housing by spring means thereof, the lever body of said first lever having a free end terminating in a finger press portion, and a push member provided at one end of the lever body of said first lever remove from the finger press portion of the lever body of said first lever, said push member being forced into engagement with said third toothed engagement portion of said cable control set and to further turn said cable control set when said first lever is turned in one direction, said push member being disengaged from said third toothed engagement portion of said cable control set when said first lever reversed to a predetermined position; and a second lever, said second levers comprising a lever body fastened pivotally with the second coupling portion of said housing and reversibly supported on the second coupling portion of said housing by spring means thereof, the lever body of said second lever having a fixed end pivoted to the second coupling portion of said housing, a free end terminating in a finger press portion, and a tooth disposed adjacent to the fixed end and adapted to engage the first toothed engagement portion and second toothed engagement portion of said cable control set selectively, the tooth of said second lever being moved with said second lever over teeth of said first toothed engagement portion stepwise when said first lever turned to rotate said cable control set forwards, the tooth of said second lever being moved with said second lever into engagement with said first toothed engagement portion and said second toothed engagement portion of said cable control set alternatively for enabling said cable control set to be returned when said second lever alternatively pressed and released.

2. The bicycle speed change control device as claimed in claim 1, wherein said housing is comprised of a casing and a cover covering said casing.

3. The bicycle speed change control device as claimed in claim 1, wherein the tooth of said second lever has a <-shaped profile.

4. The bicycle speed change control device as claimed in claim 3, wherein the first toothed engagement portion and second toothed engagement portion of said cable control set have a tooth form matching the tooth of said second lever.

5. The bicycle speed change control device as claimed in claim 1, wherein said housing further comprises a limiter adapted to limit the turning angle of said cable control set, said limiter comprising a first stop lug adapted to stop the push member of said first lever, prohibiting the push member of said first lever from engaging the third toothed engagement portion of said cable control set.

6. The bicycle speed change control device as claimed in claim 1, wherein said housing further comprises an indicator unit; said cable control set further comprises an indicator movable with said cable control set relative to said indicator unit of said housing to indicate the gearshift position of said cable control set.

7. The bicycle speed change control device as claimed in claim 1, wherein said cable control set comprises a cable wheel, and a first engagement member; the first toothed engagement portion and second toothed engagement portion of said cable control set are respectively formed in said first engagement member.

8. The bicycle speed change control device as claimed in claim 7, wherein said cable control set further comprises a second engagement member; the third toothed engagement portion of said cable control set is formed in said second engagement member.

9. The bicycle speed change control device as claimed in claim 8, wherein said cable wheel comprises a positioning portion coupled to said first engagement member; said first engagement member comprises a positioning hole adapted to receive the positioning portion of said cable wheel for enabling said cable wheel to be turned relative to said first engagement member.

10. The bicycle speed change control device as claimed in claim 1, wherein the push member of said first lever is fastened pivotally with the lever body of said first lever remove from the finger press portion of the lever body of said first lever and reversibly supported on spring means at the lever body of said first lever.

* * * * *